United States Patent
Ramamurthy et al.

(10) Patent No.: US 9,591,648 B1
(45) Date of Patent: Mar. 7, 2017

(54) SEMI-PERSISTENT SECONDARY SIGNALING CHANNELS

(71) Applicant: Sprint Spectrum L.P., Overland Park, KS (US)

(72) Inventors: Suryanarayanan Ramamurthy, Olathe, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 122 days.

(21) Appl. No.: 14/531,422

(22) Filed: Nov. 3, 2014

(51) Int. Cl.
| H04J 11/00 | (2006.01) |
| H04W 72/04 | (2009.01) |
| H04L 5/00 | (2006.01) |
| H04W 72/10 | (2009.01) |

(52) U.S. Cl.
CPC .......... *H04W 72/048* (2013.01); *H04J 11/00* (2013.01); *H04L 5/0007* (2013.01); *H04L 5/0039* (2013.01); *H04L 5/0053* (2013.01); *H04W 72/10* (2013.01); *H04J 2011/0013* (2013.01)

(58) Field of Classification Search
CPC .... H04L 5/0041; H04L 5/0053; H04L 1/0046
See application file for complete search history.

(56) References Cited

U.S. PATENT DOCUMENTS

| 2008/0233964 | A1 | 9/2008 | McCoy et al. |
| 2011/0021154 | A1* | 1/2011 | Marinier ............... H04W 72/02 455/67.11 |
| 2013/0016686 | A1* | 1/2013 | Li ........................ H04L 1/1822 370/329 |
| 2013/0083769 | A1* | 4/2013 | Qu ........................ H04L 5/0016 370/330 |
| 2013/0182664 | A1 | 7/2013 | Chen et al. |
| 2013/0215844 | A1* | 8/2013 | Seol .................... H04W 72/046 370/329 |
| 2013/0242885 | A1 | 9/2013 | Zhu et al. |

(Continued)

OTHER PUBLICATIONS

Choi, In-Hwan, Wireless Test World 2009, Agilent, Your Partner in Advancing New Wireless Communications, LTE Protocol Signaling and Control, Jul. 1, 2009, pp. 1-39.

(Continued)

*Primary Examiner* — Kevin C Harper
*Assistant Examiner* — Henry Baron

(57) ABSTRACT

An example embodiment may involve defining an orthogonal frequency-division multiplexed (OFDM) wireless air interface that contains time-division multiplexed subframes. A primary signaling channel may be formed by modulation symbols that are statically allocated to fixed time positions of each subframe, and span contiguous subcarrier frequencies. A secondary signaling channel may be defined in the OFDM wireless air interface. The secondary signaling channel may be formed by modulation symbols that are dynamically allocated to time positions of one or more subcarrier frequencies, and span at least two consecutive subframes of the OFDM wireless air interface. A signaling message may be transmitted, on the primary signaling channel, to one or more WCDs. The signaling message may be transmitted in a first subframe of the consecutive subframes, and may identify the secondary signaling channel.

20 Claims, 9 Drawing Sheets

(56) References Cited

U.S. PATENT DOCUMENTS

2014/0293957 A1* 10/2014 Chun .................. H04L 5/0041
                                                                                  370/330

OTHER PUBLICATIONS

3GPP Long Term Evolution (LTE), Jan. 31, 2013, 4 pages, http://4g-lte-world.blogspot.com/2013/01/quality-of-service-qos-in-lte.html.

Zyren, Jim, "Overview of the 3GPP Long Term Evolution Physical Layer," Freescale Semiconductor, Dr. Wes McCoy, Technical Editor, Jul. 2007, pp. 1-24.

LTE Physical, Logical and Transport Channels, http://www.radio-electronics.com/info/cellulartelecomms/lte-long-term-evolution/physical-logical-transport-channels.php, last accessed Sep. 5, 2014, pp. 1-8.

* cited by examiner

SEMI-PERSISTENT SECONDARY SIGNALING CHANNELS

BACKGROUND

In wireless networks, communication between a radio access network (RAN) device and a wireless communication device (WCD) may involve scheduling transmissions at various points in time on one or more subcarrier frequencies. In some cases, a signaling channel may be used to transmit signaling messages to or from the WCD. These signaling messages may serve to coordinate further transmissions between the RAN device and the WCD.

OVERVIEW

Some wireless air interfaces may utilize orthogonal frequency-division multiplexing (OFDM), which divides a frequency band into a plurality of orthogonal subcarrier frequencies. Data may be transmitted simultaneously (in parallel) over one or more of these subcarrier frequencies, and each subcarrier frequency may be modulated at a different data rate. These data rates may be adapted to the signal quality and/or interference characteristics of the respective subcarrier frequencies. Thus, OFDM may facilitate high data rates even in the presence of interference on some subcarrier frequencies.

OFDM systems may use one or more signaling channels to transport communication between a RAN and a WCD. For instance, a forward direction (RAN to WCD) primary signaling channel may inform the WCD of times that data is scheduled to be transmitted to the WCD on one or more subcarrier frequencies. In order to increase the likelihood that the WCD is able to receive the signaling messages transmitted on the primary signaling channel, the primary signaling channel may be formed using regularly-occurring time positions (e.g., time slots) over multiple contiguous subcarrier frequencies. A low-data-rate modulation format may be used on the signaling channel, which may also provide for more robust communication.

A drawback to such an arrangement is that, for densely-deployed wireless networks in which nearby base stations reuse the same frequencies, the primary signaling channels of these base stations may interfere with one another. Another drawback is that the capacity of such a low-data-rate primary signaling channel is limited.

In order to at least partially overcome some of these drawbacks, an enhanced, secondary signaling channel may be added to OFDM systems. Transmissions on the secondary signaling channel may be scheduled for a wider range of time slots, and may occur on as little as one subcarrier frequency. Also, if more than one subcarrier frequency is used simultaneously for the secondary signaling channel, these subcarrier frequencies need not be contiguous. Thus, inter-base-station interference may be reduced by arranging neighboring base stations to use different subcarrier frequencies for their respective secondary signaling channels. Additionally, a higher-bit-rate modulation format may be used for at least some transmissions on the secondary signaling channel. Thus, the secondary signaling channel may have a higher average data rate than the primary signaling channel.

Signaling transmissions using a secondary signaling channel may occur as follows. First, the RAN may transmit a brief signaling message on a primary signaling channel. This brief signaling message may indicate the time(s) and subcarrier frequenc(ies) on which the secondary signaling channel resides. Since most or all WCDs are configured to listen to the primary signaling channel, these WCDs may be able to learn the time and frequency locations of the secondary signaling channel. Thus, the WCDs may be able to receive a full signaling message on the secondary signaling channel. This full signaling message may indicate, to one or more WCDs, the time and frequency locations of data channels in the air interface.

In some configurations, an OFDM wireless air interface may be organized into time-division multiplexed subframes. Each subframe may include a primary signaling channel that indicates the time and frequency locations of a secondary signaling channel within that subframe. This type of configuration may be inefficient, however, especially when a secondary signaling channel spans more than one subframe. For such situations, a possible improvement may involve the RAN using the primary signaling channel in only the first subframe to transmit, to WCDs, the time and frequency locations of the secondary signaling channel. By making a secondary signaling channel semi-persistent in this fashion, signaling overhead on the primary signaling channel may be reduced, and the effective capacity of the primary signaling channel may be increased.

Accordingly, a first example embodiment may involve defining an OFDM wireless air interface that contains time-division multiplexed subframes. A primary signaling channel may be formed by modulation symbols that (i) are statically allocated to fixed time positions of each subframe, and (ii) span a plurality of contiguous subcarrier frequencies. The first example embodiment may also involve defining a secondary signaling channel in the OFDM wireless air interface. The secondary signaling channel may be formed by modulation symbols that (i) are dynamically allocated to time positions of one or more subcarrier frequencies, and (ii) span at least two consecutive subframes of the OFDM wireless air interface. The first example embodiment may further involve transmitting, on the primary signaling channel, a signaling message to one or more WCDs. The signaling message may be transmitted in a first subframe of the at least two consecutive subframes, and may identify the secondary signaling channel. Other subframes of the primary signaling channel, within the at least two consecutive subframes, might not be used to identify the secondary signaling channel.

A second example embodiment may include a non-transitory, computer-readable storage medium, having stored thereon program instructions that, upon execution by a computing device, cause the computing device to perform operations in accordance with the first example embodiment.

A third example embodiment may include a computing device, including at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, this overview and the other description throughout this document are merely for purposes of example and are not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. The aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
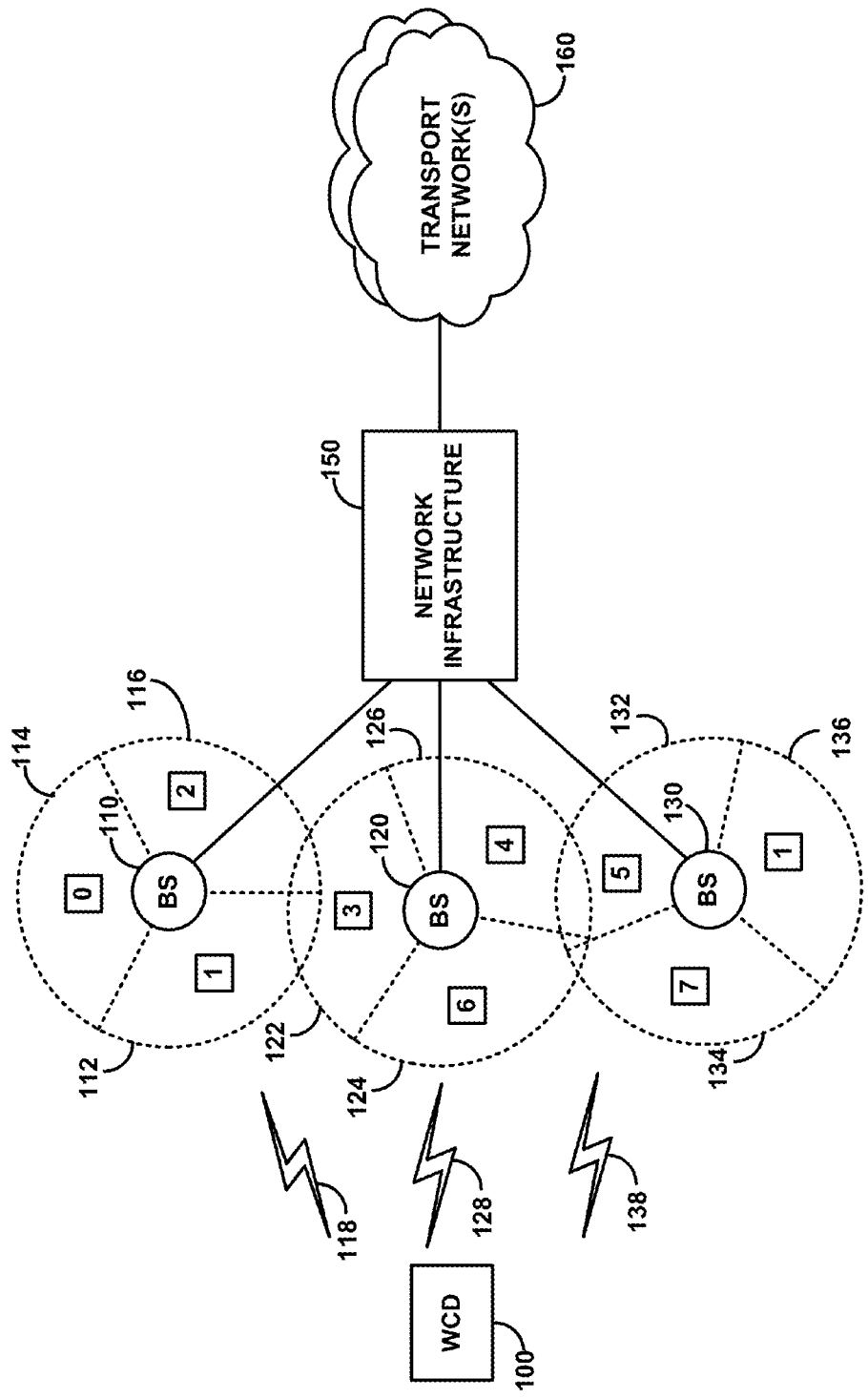
FIG. 1 is a block diagram of a wireless communication system, in accordance with example embodiments.

FIG. 1 is a block diagram of an example wireless communication system. In FIG. 1, each base station (BS) is shown radiating to define one or more wireless coverage areas, each of which may operate on a particular frequency band for instance. In particular, base station 110 is shown radiating to define wireless coverage areas 112, 114, and 116, base station 120 is shown radiating to define wireless coverage areas 122, 124, and 126, and base station 130 is shown radiating to define wireless coverage areas 132, 134, and 136.

The illustrated communication system may operate in accordance with a particular radio access technology such as code-division multiple access (CDMA) and/or Long Term Evolution (LTE). By way of example, the system may be an LTE RAN, in which case each base station may be an LTE eNodeB, and network infrastructure 150 may include elements such as a mobility management entity (MME), serving gateway (SGW) and a packet data network gateway (PGW). As another example, the system may be a CDMA RAN, in which case each base station may be a CDMA base station known as a base transceiver station (BTS), and network infrastructure 150 may include elements such as a base station controller (BSC), radio network controller (RNC), mobile switching center (MSC), and packet data serving node (PDSN). Other examples are possible as well.

FIG. 1 further depicts an example WCD 100 positioned in range of air interface communication with base station 110, base station 120, and base station 130. WCD 100 may receive wireless service from one or more of base station 110, 120, or 130 and may thereby communicate with various remote network entities, and/or with other WCDs, via network infrastructure 150 and perhaps via one or more transport networks 160.

WCD 100 may be a mobile phone, tablet computer, laptop computer, e-book reader, wearable computer, or any other type of computing device with a wireless communication interface.

In operation, each wireless coverage area in the example communication system may define an air interface. The air interface may include a forward-direction link (downlink) for carrying communications from the serving base station to served WCDs, and a reverse-direction link (uplink) for carrying communications from served WCDs to the serving base station. FIG. 1 shows air interfaces 118, 128, and 138 of wireless coverage areas 112, 124, and 134, respectively. Each of air interfaces 118, 128, and 138 may include a forward-direction link and a reverse-direction link for communicating with WCD 100. Depending on the radio access technology, these air interface links may take various forms and may define various channels for carrying particular data, such as signaling and bearer traffic for instance.

By way of example, each wireless coverage area may define a pilot channel or reference channel on which the base station may broadcast a pilot signal or reference signal. WCD 100 may detect these signals as indications of wireless coverage, and may measure these signals to determine wireless coverage strength. Further, each wireless coverage area may define one or more signaling channels that carry various overhead messages, such as system information blocks or the like, specifying characteristics and operational parameters of the wireless coverage area, and perhaps information related to other wireless coverage areas.

Each wireless coverage area may also have a respective wireless coverage area identifier, such as a Physical Cell ID (PCI) or a pseudo-noise (PN) offset. In FIG. 1, for instance, wireless coverage areas 112, 114, and 116 provided by base station 110 have identifiers 1, 0, and 2, respectively. Wireless coverage areas 122, 124, and 126 provided by base station 120 have identifiers 3, 6, and 4, respectively. Wireless coverage areas 132, 134, and 136 have identifiers 5, 1, and 7, respectively. Note that some identifiers may be reused between two or more base stations.

Each wireless coverage area identifier may be indicated to WCDs and other base stations by the pilot or reference signal of the respective wireless coverage area, or specified in another overhead broadcast message or signal. The wireless service provider may, for example, assign each wireless coverage area identifier when the wireless coverage area is installed. The wireless service provider may re-assign wireless coverage area identifiers on occasion, such as when additional wireless coverage areas are added to the network.

When a WCD first powers on or enters into the RAN's wireless coverage, the WCD may scan for pilot or reference signals and determine a signal strength for each detected signal (e.g., a received strength or signal-to-noise ratio). The WCD may determine a wireless coverage area providing the strongest pilot or reference signal, and may engage in a process to register with the network by transmitting an attach request (registration request) to the base station that is providing that signal. In one instance, WCD 100 may identify wireless coverage area 124 as providing the strongest pilot or reference signal and may then transmit an attach request to base station 120.

At the time of attachment or thereafter, a WCD may also engage in signaling with the base station to enter into a "connected" (or "active") mode. In the connected mode, the base station has provisioned a radio link connection for use by the WCD, over which the WCD can engage in bearer communication with the base station and thereby with various other entities. In that mode, for instance, the WCD may engage in packet data communications on the Internet and/or a voice call on the publicly-switched telephone network (PSTN). This configuration may be referred to as the WCD receiving wireless service from the base station, and/or the WCD using a traffic channel of the base station.

While in the connected mode, the WCD may continue to regularly scan pilot or reference signals, from both the wireless coverage area serving the WCD and from various other wireless coverage areas. Alternatively or additionally, the base station may direct the WCD to engage in such scanning from time to time. As the WCD carries out this scanning, the WCD may thus again determine the signal strengths of various wireless coverage areas, and the identities of those wireless coverage areas. For example, while connected to wireless coverage area 124, WCD 100 may determine the signal strength of wireless coverage areas 112 and 134, among others.

Further, while in the connected mode, the WCD may, from time to time, transmit to its serving base station a measurement report that specifies the signal strength of each wireless coverage area detected by the WCD. In particular, the measurement report may specify each detected wireless coverage area (e.g., by PCI) and the signal strength (e.g., reference signal receive strength, or signal-to-noise ratio) of the wireless coverage area as determined by the WCD. In practice, a given measurement report may thus include such information for the WCD's currently serving wireless coverage area and may also include such information for each of one or more other wireless coverage areas detected by the WCD.

If a measurement report specifies a signal strength of another wireless coverage area, the base station or other network node may engage in a process to decide whether to trigger handover of the WCD to the other wireless coverage area (sometimes referred to as a target wireless coverage area). In general, this process may involve evaluating the reported signal strength of the other wireless coverage area to determine whether it is sufficiently strong to support the WCD, and/or whether it is sufficiently stronger than the reported signal strength of the serving wireless coverage area. Further, the process may involve consideration of other factors as well, such as base station load and backhaul capacity for instance.

If the serving base station determines to trigger handover of the WCD to a target wireless coverage area of another base station, the serving base station may then reference its neighbor relations table (NRT) of nearby wireless coverage areas. The NRT may include indicators (e.g., PCIs) of nearby wireless coverage areas. For each wireless coverage area in the NRT, the NRT may also include an address, such as an IP address, for the base station that defines the wireless coverage area. In this way, a base station or other RAN component, and/or a WCD, may be able to determine how to communicate with a base station that defines a target wireless coverage area.

For instance, the serving base station may find, in the NRT, a particular wireless coverage area having a PCI matching that of the target wireless coverage area. Next, the serving base station may transmit to that other base station, either over a direct inter-base-station interface or through one or more other network entities, a handover request message that requests the other base station to provide service to the WCD via the target wireless coverage area. The handover request message may specify the target wireless coverage area using that wireless coverage area's PCI. The other base station may then engage in a handover preparation process to establish a radio link for the WCD, and the WCD may ultimately transition to be served by that other base station.

Figure 2:
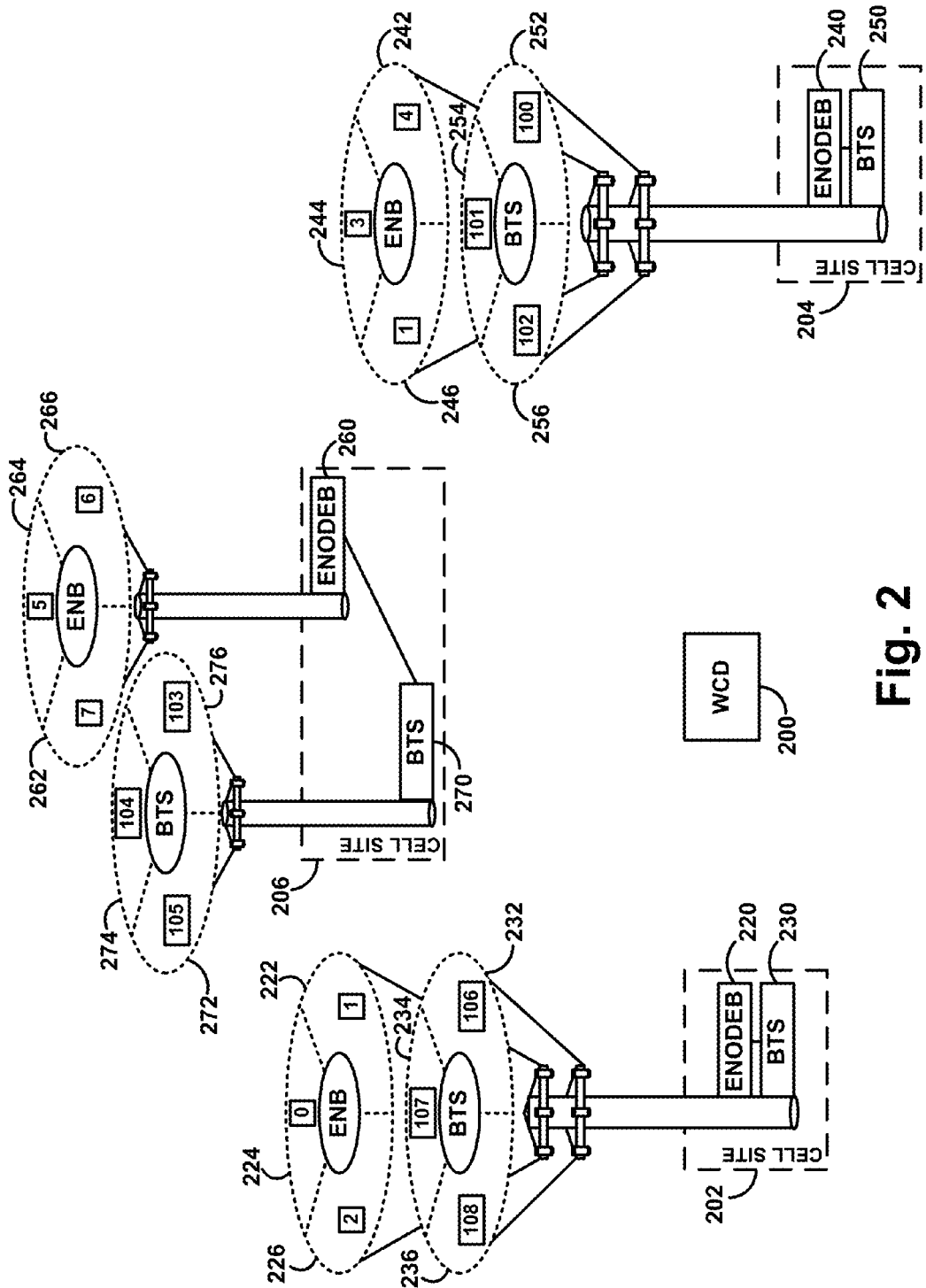
FIG. 2 is a block diagram of various types RAN components, in accordance with example embodiments.

FIG. 2 is a simplified block diagram of an example communication system in which the present method can be implemented. The example communication system may provide wireless service within a market area. Within the example communication system, components of both an LTE RAN and a CDMA RAN are shown. While an LTE RAN and a CDMA RAN are shown for the purpose of example and explanation, the present method may be implemented using any one or more RANs. For example, the present embodiments may be implemented in a market area in which a wireless service provider operates an LTE RAN and a GSM RAN. Moreover, the present embodiments may be implemented using a RAN that operates according to one or more other radio access technologies that have yet to be developed.

As shown in FIG. 2, the LTE RAN includes at least eNodeB 220, 240, and 260. ENodeB 220 radiates to provide LTE wireless coverage areas 222, 224, and 226, eNodeB 240 radiates to provide LTE wireless coverage areas 242, 244, and 246, and eNodeB 260 radiates to provide LTE wireless coverage areas 262, 264, and 266. Further, the LTE RAN may include additional components not shown, such as network infrastructure 150 of FIG. 1.

The CDMA RAN includes at least base transceiver stations (BTS) 230, 250, and 270. BTS 230 radiates to provide CDMA wireless coverage areas 232, 234, and 236, BTS 250 radiates to provide CDMA wireless coverage areas 252, 254, and 256, and BTS 270 radiates to provide CDMA wireless coverage areas 272, 274, and 276. Further, the CDMA RAN may include additional components not shown.

WCD 200 may operate within the range of these base stations. To receive wireless service, WCD 200 may engage in air interface communication with one or more of eNodeB 220, 240, and 260 of the LTE RAN. WCD 200 may also engage in air interface communication with one or more of BTS 230, 250, and 270 of the CDMA RAN. Air interface communication with components of the LTE RAN may occur concurrently with air interface communication with components of the CDMA RAN, or may occur separately.

Components of a communication system may be co-located and/or integrated together in various ways. For example, as a wireless service provider builds out an LTE RAN in the same market area as a CDMA RAN, LTE eNodeBs may be co-located with CDMA BTSs. For instance, in FIG. 2, eNodeBs of the LTE RAN are shown co-located with BTSs of the CDMA RAN at cell sites. Particularly, eNodeB 220 and BTS 230 are co-located at cell site 202 and share the same tower structure, as shown. ENodeB 240 and BTS 250 are co-located at cell site 204 and also share the same tower structure. ENodeB 260 and BTS 270 are co-located at cell site 204 and are shown having separate tower structures. Further, pairs of co-located base stations, such as eNodeB 220 and BTS 230, may share additional infrastructure, such as network infrastructure 150 as shown in FIG. 1.

The depictions of FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present embodiments.

Moreover, the arrangement of the depicted wireless communication system, and the processes described herein, are set forth herein for purposes of example only. Other arrangements and elements (e.g., machines, interfaces, operations, orders of elements, etc.) can be added or used instead, and some elements may be omitted altogether. Further, many of the elements described herein are entities that may be implemented as discrete components or in conjunction with other components, in any suitable combination and location, and that various disclosed operations can be implemented by any combination of hardware, firmware, and/or software, such as by one or more processors programmed to execute computer instructions for instance.

2. Example Computing Device

Figure 3:
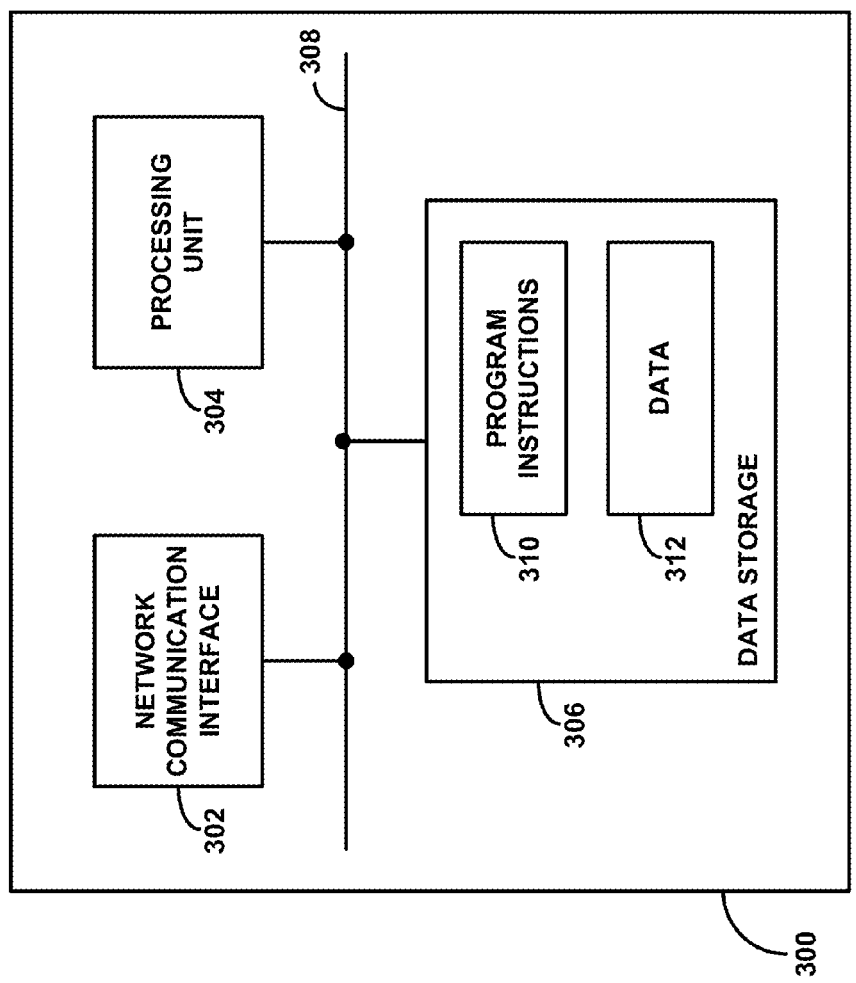
FIG. 3 is a block diagram of a computing device, in accordance with example embodiments.

FIG. 3 depicts a possible embodiment of a device that can be programmed to execute computer instructions. Particularly, FIG. 3 is a block diagram of an example computing device 300. Computing device 300 could be a standalone general purpose or specialized computing device. Alternatively, computing device 300 could be a WCD or part of a RAN, such as a base station, serving gateway, packet gateway, or some other type of RAN component or computer.

As shown, computing device 300 includes a network communication interface 302, a processing unit 304, and data storage 306, all of which may be communicatively linked together by a system bus, network, or other connection mechanism 308. Computing device 300 may also include additional components, units, and/or interfaces not shown in FIG. 3, such as a keyboard, a mouse, a touch screen, a monitor, a printer, and/or one or more ports that interface with such devices, for example a universal serial bus (USB) or high-definition multimedia interface (HDMI) port.

Network communication interface 302 may support communication with various other network entities, such as any of the network entities shown in FIG. 1 or 2. As such, the interface 302 may include one or more network interface modules, such as Ethernet, Wifi, BLUETOOTH®, and/or wide-area wireless connection network interface modules, or any other type of wired and/or wireless communication interfaces.

Processing unit 304 may comprise one or more general purpose processors (e.g., microprocessors) and/or one or more special purpose processors (e.g., application specific integrated circuits, digital signal processors, and/or network processors). Data storage 306 may comprise one or more volatile and/or non-volatile non-transitory storage components, such as optical, magnetic, or flash storage, and may be integrated in whole or in part with processing unit 304.

As shown, data storage 306 may hold program instructions 310 and data 312. Program instructions 310 may be executable by processing unit 304 to carry out various operations described herein and/or depicted in the accompanying drawings. Data 312 could be any data that is generated, received, stored, or used in connection with carrying out such operations.

3. Example Channel Structures

Some of the embodiments described herein relate to use of various types of control channels. For purposes of illustration, this section provides an overview of example LTE wireless channel structures, including how control channels are supported in these channel structures. Nonetheless, in various types of LTE systems, or other wireless technologies, other channel structures, organizations, or arrangements may be used, and the control channel embodiments herein may operate in these alternative channel structures.

As an example, LTE may use OFDM in the forward direction, and either single-channel frequency-division multiple access (SC-FDMA) or OFDM in the reverse direction. OFDM may be advantageous in wireless networks because it is able to achieve high data rates without significant inter-symbol interference.

Under LTE, the air interface may include multiple frequency bands arranged to cover a total bandwidth in frequency space that depends on what portion or portions of the radio spectrum are licensed by the network service provider, and on which of two types of systems is deployed. In frequency division duplex (FDD) LTE systems, the forward direction and reverse direction links each occupy a different block of radio spectrum, each block providing up to 20 MHz of bandwidth in frequency space. Thus, under FDD LTE systems, forward direction and reverse direction transmissions can be concurrent. In time division duplex (TDD) LTE systems, the forward direction and reverse direction links each occupy the same block of radio spectrum. Therefore, under TDD LTE, forward direction and reverse direction transmissions take turns according to configuration-specific allocation of subframes within repeating radio transmission frames. Whether FDD or TDD is used in a particular frequency space may depend on where that frequency spaces falls within the network service provider's licensed spectrum.

For both FDD and TDD LTE, each frequency band may be divided into 12 orthogonal subcarrier frequencies, each 15 kHz in width, for a total of 180 kHz per frequency band. The number of frequency bands corresponds to the integer division of the total bandwidth by 180 kHz. For example, a total bandwidth of 1.25 MHz supports six frequency bands, while a total bandwidth of 20 MHz supports over 100 frequency bands. The orthogonality of the subcarrier frequencies follows from each being an integer multiple of the same minimum-size frequency band, e.g., 15 kHz. Nonetheless, a different minimum-size frequency could be used, as long as the orthogonality condition is met. Similarly, a different number of subcarrier frequencies per frequency band could be used, which could then lead to a different number frequency bands for a given total bandwidth.

In the time domain, both the forward direction and reverse direction channels are based on time slots, each time slot may be of a 0.5 millisecond duration. Every two time slots makes up one "subframe" of a 1.0 millisecond duration, and every 10 subframes makes up a 10 millisecond frame. In FDD LTE, each frame carries only forward direction or reverse direction transmissions. In TDD LTE, each frame includes both forward direction and reverse direction subframes, and the relative number of and placement of each type of subframe may be specified by defined standards and/or a system-specific configuration.

Each time slot is subdivided into an integer number of symbol durations, such that the integer number multiplied by the symbol duration equals 0.5 msec. In some implementations, the integer number is either 6 or 7—the value used may depend on the network's operating conditions, among other possible factors. For the purposes of the present discussion, the integer number of symbol durations per time slot will be assumed to be 7, with the understanding that other values could be used.

Figure 4:
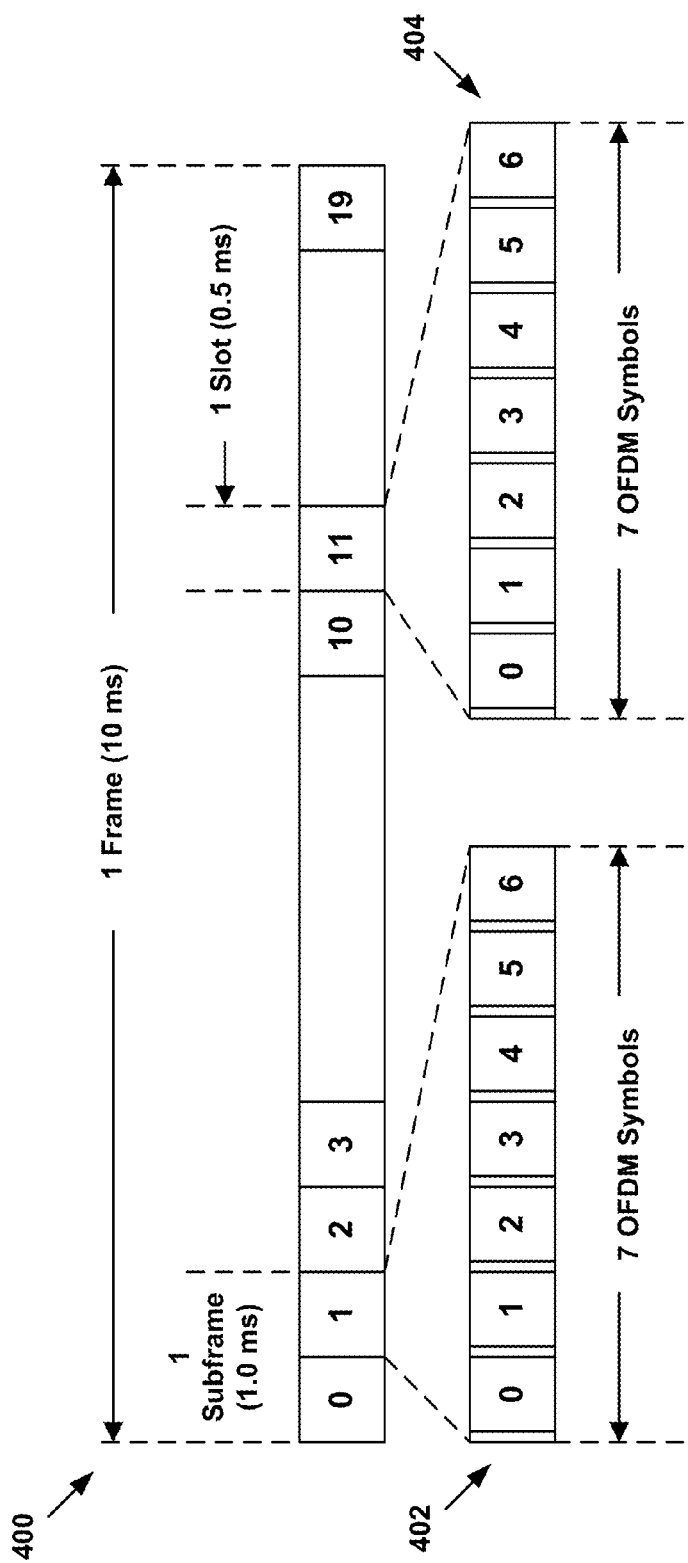
FIG. 4 depicts a transmission frame structure, in accordance with example embodiments.

An example overall LTE frame is shown in FIG. 4. Frame 400 is 10 milliseconds (ms) long and consists of 10 equal length subframes. Each of these subframes consists of 2 equal length time slots (e.g., in FIG. 4, time slots 0 and 1 form a subframe). For purposes of example, time slots 1 and 11 are shown to each contain sequences of OFDM symbols 402 and 404, respectively. As noted above, other arrangements are possible.

Transmissions may be scheduled in time-frequency units referred to as "resource blocks" or RBs. Each RB is made up of 7 contiguous symbol durations (i.e., one time slot) and 12 contiguous subcarrier frequencies of a given frequency band. Therefore, an RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition of frequency domain symbols. On given forward direction or reverse direction link, concurrent transmissions carried in different RBs are non-interfering in the sense that the subcarrier frequencies are orthogonal. Thus, while a receiving device (e.g., a WCD on a forward direction link or an eNodeB on a reverse direction link) may receive a superposition signal, the orthogonality property allows recovery by Fourier decomposition of the symbols in the frequency domain.

A single subframe containing two resource blocks may be the smallest unit of allocation made for transmissions to or from a particular WCD. Allocations may be made by an eNodeB serving the WCD, and more than one subframe can be allocated for the WCD. Multiple subframe allocations for a particular WCD can be made across multiple frequency bands, across multiple time periods, or both, depending on factors including the amount of data to be transmitted to or by the WCD, the type of data (e.g., best-effort, interactive, streaming, etc.), and resources needed for other WCDs. When multiple subframes are allocated to a WCD across multiple time periods, each subframe allocated to the WCD may contain an indication of the allocation.

In some cases, the term "resource block" refers to a group of 12 contiguous subcarrier frequencies over an entire subframe. Thus, an RB could be interpreted as 14 contiguous symbols of the time domain in each of these 12 contiguous subcarrier frequencies. However, for expository purposes, herein it is assumed that an RB is only 7 contiguous symbols of the time domain in each of 12 contiguous subcarrier frequencies, as described above. Nonetheless, other arrangements are possible.

Figure 5:
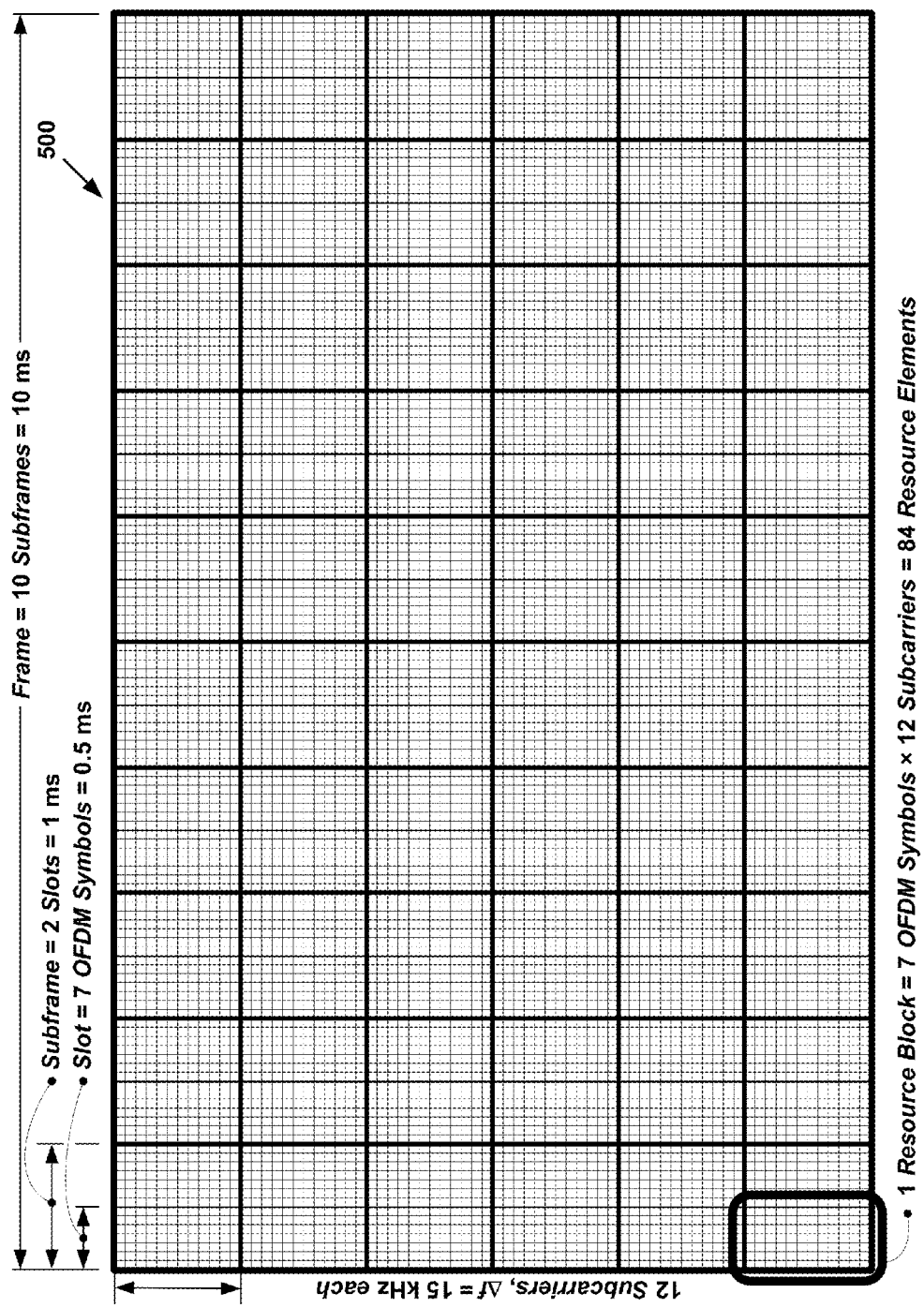
FIG. 5 is an illustrative representation of a multi-frequency transmission frame, in accordance with example embodiments.

FIG. 5 illustrates an example of an LTE radio transmission frame 500. As shown in FIG. 5, an LTE radio transmission frame can be described as grid of OFDM symbols arrayed in time and frequency. As noted previously, in the time dimension, a frame may contain ten subframes, each one millisecond in duration, for a total frame duration of 10 milliseconds, and each 0.5 millisecond time slot may consist of 7 symbols. Also as noted previously, the frequency dimension is made up of multiple, contiguous frequency bands, each subdivided into 12 contiguous, 15 kHz wide subcarriers for a total bandwidth of 180 kHz per frequency band.

Each frame contains 20 RBs in the time dimension and a deployment-specific number of RBs in the frequency dimension. In FIG. 5, resource elements are represented by the smallest grid units shown. The organization of resource elements into RBs, RBs into time slots, time slots into subframes, and subframes into frame 500 is indicated in FIG. 5 in correspondence with the above description.

As discussed above, LTE can be deployed in a frequency division duplex (FDD) mode or a time division duplex (TDD) mode. In FDD LTE, the forward direction and reverse direction links occupy different frequencies of the spectrum, so transmission frames, such as frame 500, are dedicated to only forward direction transmissions within a block allocated for the forward direction link, or only reverse direction transmissions within a block allocated for the reverse direction link. In TDD LTE, the forward direction and reverse direction links share the same spectrum, so forward direction and reverse direction transmissions are allocated specific time windows. More particularly, each frame is configured with certain subframes allocated for forward direction transmission, and other subframes allocated for reverse direction transmissions. The specific configuration of forward direction and reverse direction subframes per frame in TDD LTE can be set according to defined standards, for example.

In addition to carrying OFDM symbols encoding data and/or signaling information related to a particular WCD, some forward direction resource elements of a particular RB may be allocated as "reference signals," and used to carry pilot signals from the eNodeB. Upon detection of a pilot signal in one or more resource elements of an RB, a WCD may determine the signal-to-interference-plus-noise ratio (SINR) of the eNodeB (or more generally, the base station) that made the RB-based transmission. As noted previously, the WCD may then use the SINR (or another signal-to-noise-ratio (SNR) measure) of different eNodeBs that it detects to determine if and when to hand off from one eNodeB to another eNodeB, for example.

Specific subframes of the forward direction channels can also be configured as channels for carrying system messages and/or other overhead data. In addition, specific subframes of the reverse direction channels can be configured to support a random access procedure by which WCDs can request network access.

One of the types of channels that may be defined across forward direction subframes is the Physical Downlink Shared Channel (PDSCH). A PDSCH may carry data and multimedia, and thus may be configured to support high data rates. Symbol modulation formats supported by the PDSCH include Quadrature Phase Shift Keying (QPSK), supporting 2 bits per symbol, 16-way Quadrature Amplitude Modulation (16QAM), supporting 4 bits per symbol, and 64-way Quadrature Amplitude Modulation (64QAM), supporting 6 bits per symbol. Other modulation formats may be used. Spatial multiplexing may also be used on the PDSCH to increase data rates.

Another of the channels that may be defined across forward direction subframes is the Physical Downlink Control Channel (PDCCH). The PDCCH may convey WCD-specific control information to one or more WCDs. Robustness, rather than just maximum data rate, is therefore a consideration. Consequently, Binary Phase Shift Keying (BPSK), supporting 1 bit per symbol, or QPSK, supporting 2 bits per symbol, may be the only available modulation formats. The PDCCH is mapped onto resource elements across a block of contiguous subcarrier frequencies, in up to the first three OFDM symbols in the first time slot of a subframe. Alternatively, the PDCCH could be mapped onto resource elements in other time slots of the subframe.

Figure 6A:
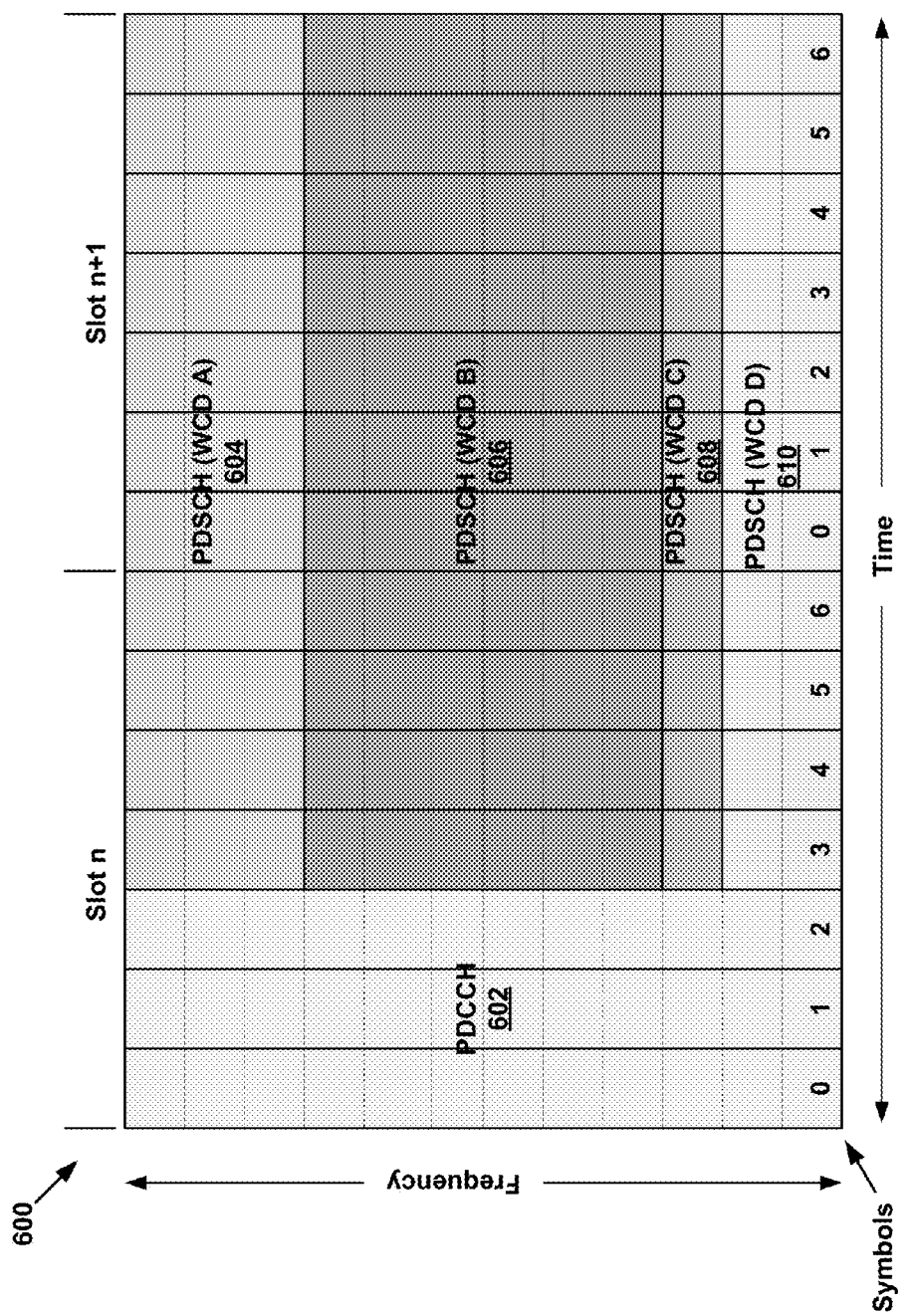
FIG. 6A is an illustrative representation of signaling and data channels, in accordance with example embodiments.

FIG. 6A provides an illustrative example of how a PDCCH and PDSCHs are formed in a subframe 600. In the time domain, subframe 600 includes two time slots, n and n+1. In the frequency domain, subframe 600 includes 12 groups of 12 contiguous subcarrier frequencies, for a total extent of 144 contiguous subcarrier frequencies. PDCCH 602 encompasses the first three symbols of time slot n for each of the 144 contiguous subcarrier frequencies. Thus, PDCCH 602 includes a total of 432 symbols.

FIG. 6A also illustrates example mappings of the remaining symbols in the subframe to PDSCHs, and allocation of these PDSCHs to WCDs. Thus, PDSCH 604 encompasses three groups of 12 contiguous subcarrier frequencies (3 RBs) and is allocated to WCD A, PDSCH 606 encompasses six groups of 12 contiguous subcarrier frequencies (6 RBs) and is allocated to WCD B, PDSCH 608 encompasses one group of 12 contiguous subcarrier frequencies (1 RB) and is allocated to WCD C, and PDSCH 610 encompasses two groups of 12 contiguous subcarrier frequencies (2 RBs) and is allocated to WCD D. Other arrangements are possible, including those in which a particular WCD is allocated fewer than 11 symbols of a subframe.

A PDCCH may carry transmissions of Downlink Control Information (DCI) messages that contain control information for a particular WCD or group of WCDs. For the forward direction link, this control information may include subframe assignments (e.g., when and on which groups of subcarriers the WCD or WCDs should listen for forward direction data), the modulation format(s) used to transmit the forward direction data, the hybrid ARQ process to which the forward direction data belongs, and so on. For the reverse direction link, the control information may also include subframe assignments, as well as timing adjustments, transmission power levels, and so on.

One possible limitation of the PDCCH is that it may exhibit a low data rate due to its use of BPSK or QPSK. Another possible disadvantage is that it spans most or all subcarriers used by a wireless coverage area. This may result in neighboring wireless coverage areas that use the same subcarriers interfering with one another's PDCCH transmissions. For instance, in a location with dense wireless coverage (as one example, tens or hundreds of pico-cellular base stations deployed throughout a city block), base stations radiating to define their respective wireless coverage areas in overlapping frequency ranges may interfere with one another. In particular, their respective PDCCHs may interfere, which lowers the reliability of these channels. Consequently, wireless coverage areas subject to this interference may exhibit lower effective data rates.

One way to potentially overcome this problem is to use a secondary signaling channel in addition to or instead of the PDCCH. For instance, an extended PDCCH (ePDCCH) may be used. An ePDCCH may be dynamically assigned to one or more subframes on one or more of the subcarrier frequencies that might otherwise be used for a PDSCH. Unlike a PDCCH, the groups of subcarrier frequencies used for an ePDCCH might not be contiguous, and may be modulated using a wider variety of bits per symbol (e.g., BPSK, QPSK, 16QAM, 64QAM, etc.).

Figure 6B:
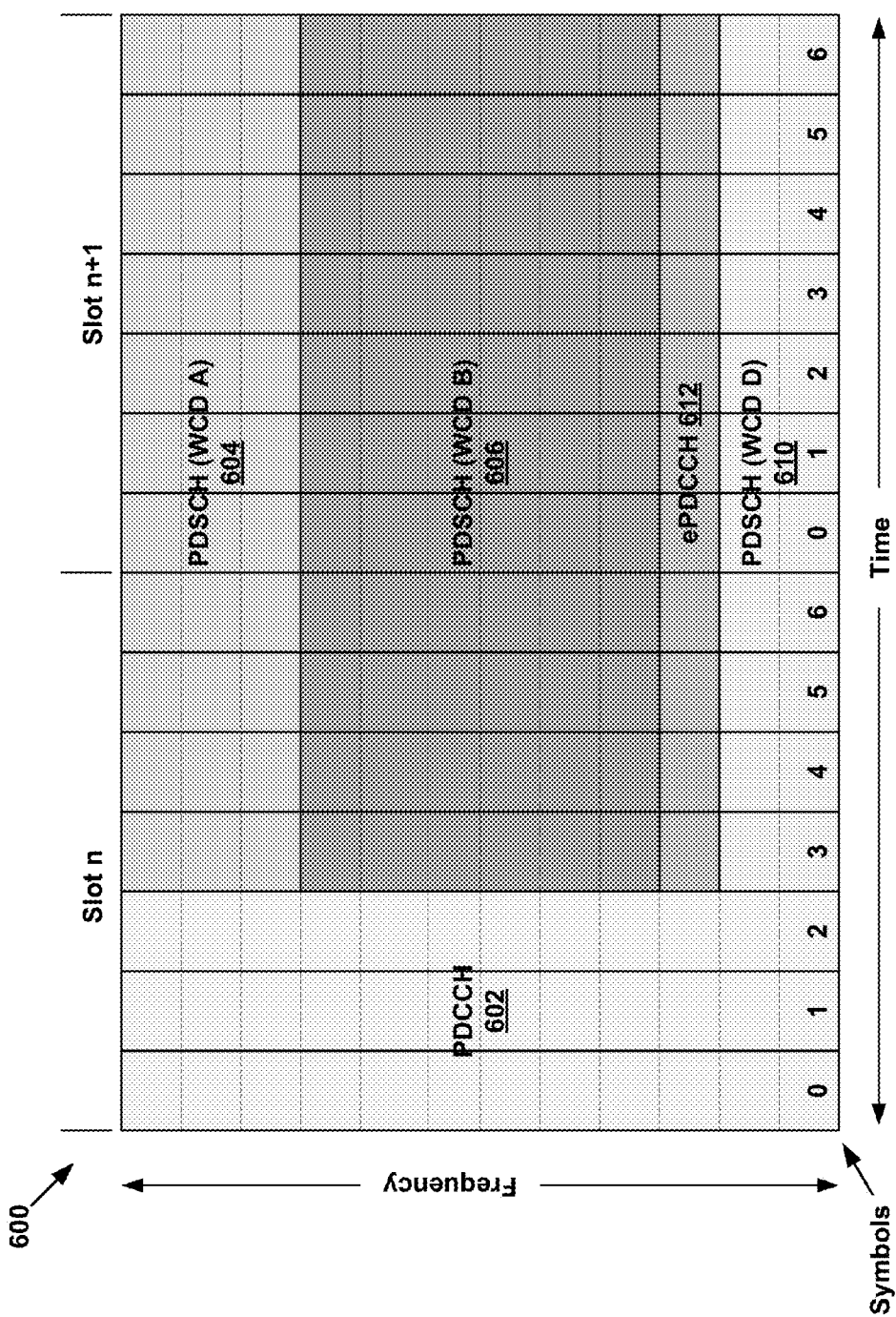
FIG. 6B is another illustrative representation of signaling and data channels, in accordance with example embodiments.

FIG. 6B provides an illustrative example of how a PDCCH, an ePDCCH and PDSCHs can be formed in subframe 600. In FIG. 6B, subframe 600 is identical to subframe 600 in FIG. 6A, with the exception that PDSCH 608 is replaced by ePDCCH 612. While FIG. 6B depicts ePDCCH 612 using 11 symbols on one group of 12 contiguous subcarrier frequencies, more or fewer symbols may be used to form an ePDCCH, and an ePDCCH may be formed using more than one group of 12 subcarrier frequencies.

Herein, a PDCCH may be referred to as a primary signaling channel, and an ePDCCH may be referred to as a secondary signaling channel. However, these designations are made for purposes of convenience and should be interpreted as non-limiting. For instance, various types of a primary signaling channel, a secondary signaling channel, or both, may be used by the RAN to schedule and/or transmit one or more signaling messages to one or more WCDs.

Signaling transmissions using an ePDCCH may occur as follows. First, the RAN may transmit a brief signaling message on the PDCCH indicating the time(s) and subcarrier frequenc(ies) on which the ePDCCH resides. Since most or all WCDs are configured to listen to the PDCCH, these WCDs may be able to learn the time and frequency location of the ePDCCH. Thus, the WCDs may be able to receive a full signaling message on the ePDCCH by listening at the right time and on the right subcarrier frequency. This full signaling message may indicate, to one or more WCDs, the time and frequency locations of data channels in the air interface.

By using an ePDCCH, the RAN may be able to transmit more signaling messages in a unit of time, transmit signaling messages to more WCDs in a unit of time, and or transmit signaling messages that are modulated to a higher data rate than the associated PDCCH. In this way, use of an ePDCCH may reduce the RAN's signaling queues in busy wireless coverage areas. Further, neighboring eNodeBs can be configured to use different subcarrier frequencies for their respective ePDCCHs. Accordingly, interference on signaling channels may be reduced.

4. Example Operations

There are various enhancements that can be made to the use and signaling characteristics of a PDCCH and/or an ePDCCH (or, more generally, the use and signaling characteristics of a primary signaling channel and/or a secondary signaling channel) that may further improve the performance of an air interface. Some of these enhancements are discussed below.

As noted above, when multiple subframes are allocated to a WCD across multiple time periods, each subframe allocated to the WCD may contain an indication of the allocation. Put another way, each sub frame may include a primary signaling channel that indicates the time and frequency locations of a secondary signaling channel within the subframe. This type of configuration may be inefficient, especially when a secondary signaling channel spans more than one subframe.

For such situations, a possible improvement may involve the primary signaling channel transmitting, in only the first of these subframes, the time and frequency locations of the secondary signaling channel. Included in this transmission are the time and frequency locations of the secondary signaling channel across the multiple subframes that the secondary signaling channel spans. By making a secondary signaling channel semi-persistent in this fashion (in that the secondary signaling channel persists beyond the frame in which it is identified by the primary signaling channel), signaling overhead on the primary signaling channel may be reduced, and the effective capacity of the primary signaling channel may be increased.

Figure 6C:
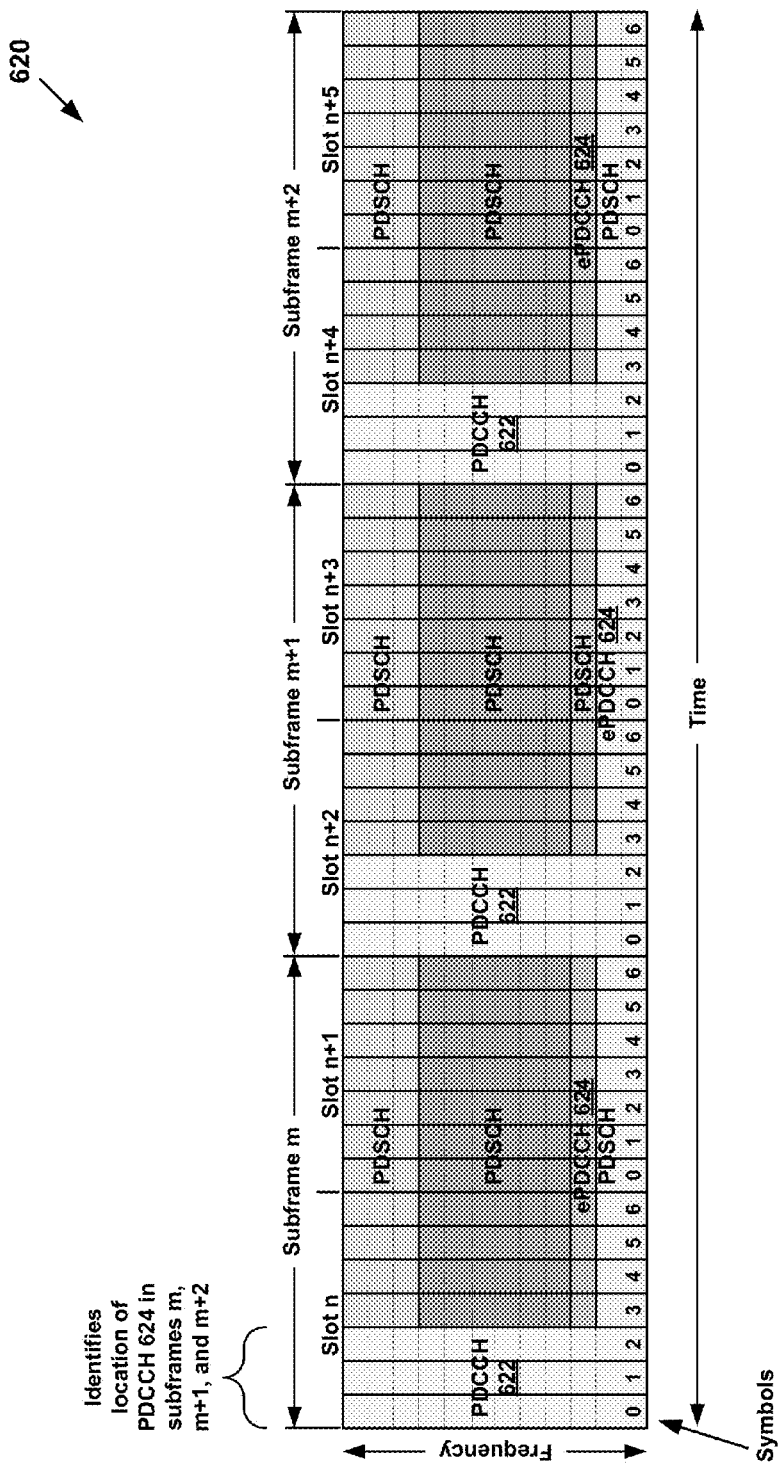
FIG. 6C is yet another illustrative representation of signaling and data channels, in accordance with example embodiments.

As an example, consider FIG. 6C. This figure depicts a series of consecutive subframes 620, which include subframes m, m+1, and m+2. Each subframe consists of two slots, slots n and n+1, n+2 and n+3, and n+4 and n+5, respectively. Further, each subframe includes the primary signaling channel (PDCCH 622) and the secondary signaling channel (ePDCCH 624). Notably, ePDCCH 624 uses one subcarrier frequency group in subframe m, a different two subcarrier frequency groups in subframe m+1, and the one subcarrier frequency group again in subframe m+2. The remaining resource blocks in subframes m, m+1, and m+2 that are not dedicated to PDCCH 622 may be used (as shown in FIG. 6C) for one or more PDSCHs.

In FIG. 6C, the efficiency of PDCCH 622 may be improved by transmitting, on PDCCH 622 in subframe m, the time and frequency locations of ePDCCH 624 in subframes m, m+1, and m+2. Thus, there would be no need to transmit, on PDCCH 622 in subframes m+1 and m+2, the time and frequency locations of ePDCCH 624 in those respective subframes. Accordingly, the capacity of PDCCH 622 in subframes m+1 and m+2 that might otherwise be used for these transmissions can be used for other purposes.

For example, in subframe m, PDCCH 622 may indicate (i) that ePDCCH 624 spans subframes m, m+1, and m+2, and (ii) the subcarrier frequency groups used in each of these subframes. In this way, the RAN and the WCDs may obtain the same understanding of how many subframes, and what subcarrier frequency groups, that ePDCCH 624 spans. The WCDs may use this understanding for determining when to again listen to PDCCH 622 for the subframe and subcarrier group information. Alternatively, the RAN and WCDs may be pre-configured with this information, or may obtain the information through some other technique (e.g., a different exchange of signaling messages).

This type of configuration may be used regardless of where in time or frequency ePDCCH 624 is formed. Therefore, in some embodiments, ePDCCH 624 may use different subcarrier frequency groups, a different number of subcarrier frequency groups, and/or a different number of time slots than is shown in FIG. 6C. For instance, unlike FIG. 6C, ePDCCH 624 may use the same subcarrier frequency group in all subframes, or may use a different subcarrier frequency group in each subframe. Further, ePDCCH 624 may span more than the three subframes shown in FIG. 6C.

In some embodiments, the number of subframes between a PDCCH indicating the time and frequency locations of a particular ePDCCH may be based on the strength at which the WCD(s) receive signals from the RAN on the subcarrier frequencies used by the ePDCCH. As an example, if a WCD receives signals on these subcarrier frequencies at a high strength, the RAN may increase the number of subframes between when the PDCCH indicates the time and frequency locations of the ePDCCH. On the other hand, if the WCD receives the signals at a low strength, the RAN may decrease the number of subframes between when the PDCCH indicates the time and frequency locations of the ePDCCH. In some cases, this number may be decreased to one, which means that the RAN might default back to transmitting the time and frequency locations of the ePDCCH in each subframe.

Alternatively or additionally, the RAN may determine this number based on a priority level (e.g., a quality of service level) associated with the WCD or its traffic. As a WCD moves about, or as the WCD's physical environment changes, the WCD may experience different levels of distortion and/or interference on various subcarrier frequencies, and these levels may change over time. The RAN may attempt to monitor the strengths at which the WCD receives signals on these subcarrier frequencies, so that the RAN can change the subcarrier frequencies used for communication to the WCD, should these strengths become too low.

As a consequence of distortion and/or interference, it may be beneficial to lower the number of subframes between when the PDCCH indicates the time and frequency locations of the ePDCCH for high-priority WCDs (e.g., WCDs that are subscribed to a premium service) or WCDs receiving high-priority traffic (e.g., real-time media, such as voice or video). In this way, it is more likely that these WCDs will be able to successfully communicate. Conversely, for lower priority WCDs (e.g., WCDs that are subscribed to a lower tier of service) or WCDs receiving low-priority traffic (e.g., best effort services, such as web browsing or email), it may be beneficial to raise the number of subframes between when the PDCCH indicates the time and frequency locations of the ePDCCH. In doing so, the efficiency of the PDCCH may be increased, with limited impact on the lower priority WCDs or their traffic.

Figure 7:
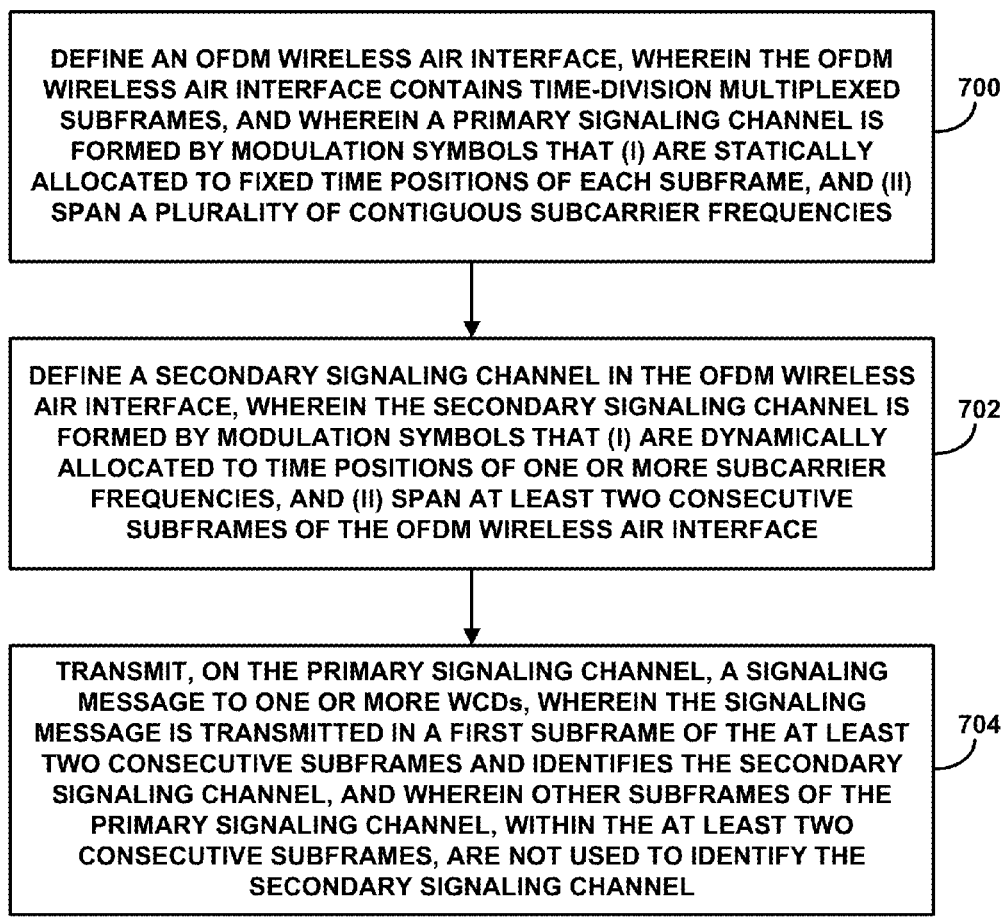
FIG. 7 is a flow chart, in accordance with example embodiments.

FIG. 7 is a flow chart in accordance with example embodiments. The operations of this flow chart may be carried out by one or more computing devices, such as computing device 300, and/or a RAN device. Further, the operations of the flow chart may be combined with any feature disclosed by or in the context any of the previous figures.

At block 700 of FIG. 7, an OFDM wireless air interface may be defined. The OFDM wireless air interface may contain time-division multiplexed subframes. A primary signaling channel may be formed by modulation symbols that (i) are statically allocated to fixed time positions of each subframe, and (ii) span a plurality of contiguous subcarrier frequencies. In some cases, the fixed time positions of each subframe may consist of three modulation symbols per subcarrier frequency.

At block 702, a secondary signaling channel in the OFDM wireless air interface may be defined. The secondary signaling channel may be formed by modulation symbols that (i) are dynamically allocated to time positions of one or more subcarrier frequencies, and (ii) span at least two consecutive subframes of the OFDM wireless air interface. It is possible that the modulation symbols of the secondary signaling channel may be dynamically allocated to time positions of at least two non-contiguous subcarrier frequencies.

At block 704, a signaling message may be transmitted, on the primary signaling channel, to one or more WCDs. The signaling message may be transmitted in a first subframe of the at least two consecutive subframes, and may identify the secondary signaling channel. Other subframes of the primary signaling channel, within the at least two consecutive subframes, might not be used to identify the secondary signaling channel. Other secondary signaling channels, however, may be identified in these subframes.

For instance, if the at least two consecutive subframes consists of p subframes (where p is at least two), then in the first of these subframes, the primary signaling channel may identify the secondary signaling channel. However, in the following p−1 subframes, the primary signaling channel may identify the secondary signaling channel will not identify the secondary signaling channel.

In some embodiments, the signaling message may be a first signaling message. In response to the signaling message identifying the secondary signaling channel, a second signaling message may be transmitted, on the secondary signaling channel, to the one or more WCDs.

The signaling message may indicate a number of consecutive subframes that the secondary signaling channel spans. Alternatively, the number of consecutive subframes that the secondary signaling channel spans may be preconfigured in the RAN device and the one or more WCDs. This number may take on values such as 2, 3, 5, 10, etc.

Further, the number of consecutive subframes that the secondary signaling channel spans may be based on respective strengths at which a particular one of the WCDs receives signals on the one or more subcarrier frequencies. For instance, the number of consecutive subframes that the secondary signaling channel spans may be proportional to the respective strengths. As an example, if the respective signal strengths are high, the number of consecutive subframes may take on a larger value. However, if the respective signal strengths are low, the number of consecutive subframes may take on a smaller value.

In some cases, the modulation symbols of the primary signaling channel may include an encoding of whether the modulation symbols of the secondary signaling channel are modulated at a first data rate or a second data rate. The first data rate may be obtained using BPSK or QPSK, for example, and the second data rate may be obtained using 16QAM, 64QAM, etc.

Defining the secondary signaling channel may involve (i) determining that a particular one of the WCDs is associated with a priority level that is less than a threshold priority level, and (ii) possibly based on the particular one of the WCDs being associated with the priority level that is less than the threshold priority level, defining the secondary signaling channel to span the at least two consecutive subframes.

The priority level may be a WCD priority level and the threshold priority level may be a threshold WCD priority level. For instance, all WCDs may be categorized as one of low priority, medium priority, or high priority. If the threshold priority level is the medium priority level, then the secondary signaling channel might span at least two consecutive subframes only for low priority WCDs, and just one subframe otherwise.

The priority level may be a traffic priority level and the threshold priority level may be a threshold traffic priority level. For instance, all WCD traffic may be categorized as one of low priority, medium priority, or high priority. If the threshold priority level is the medium priority level, then the secondary signaling channel might span at least two consecutive subframes when a WCD is exchanging low priority traffic, and just one subframe otherwise.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical operations of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each illustrated element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

defining, by a radio access network (RAN) device, an orthogonal frequency-division multiplexed (OFDM) wireless air interface, wherein the OFDM wireless air interface contains time-division multiplexed subframes, and wherein a primary signaling channel is formed by modulation symbols that (i) are statically allocated to fixed time positions of each subframe, and (ii) span a plurality of contiguous subcarrier frequencies;

determining a number of consecutive subframes that a secondary signaling channel spans in the OFDM wireless air interface, wherein the number is based on respective strengths at which a specific one of one or more wireless communication devices (WCDs) receives signals on one or more of the subcarrier frequencies, and wherein the number indicates at least two consecutive subframes;

defining, by the RAN device, the secondary signaling channel in the OFDM wireless air interface, wherein the secondary signaling channel is formed by modulation symbols that (i) are dynamically allocated to time positions of one or more of the subcarrier frequencies, and (ii) span the at least two consecutive subframes of the OFDM wireless air interface; and transmitting, on the primary signaling channel, a signaling message to the one or more WCDs, wherein the signaling message is transmitted in a first subframe of the at least two consecutive subframes and identifies the secondary signaling channel, and wherein other subframes of the primary signaling channel, within the at least two consecutive subframes, are not used to identify the secondary signaling channel.

2. The method of claim 1, wherein the signaling message is a first signaling message, the method further comprising:

in response to the signaling message identifying the secondary signaling channel, transmitting, on the secondary signaling channel, a second signaling message to the one or more WCDs.

3. The method of claim 1, wherein the signaling message indicates the number of consecutive subframes that the secondary signaling channel spans.

4. The method of claim 1, wherein the number of consecutive subframes that the secondary signaling channel spans is proportional to the respective strengths.

5. The method of claim 1, wherein the modulation symbols of the primary signaling channel include an encoding of whether the modulation symbols of the secondary signaling channel are modulated at a first data rate or a second data rate.

6. The method of claim 1, wherein the fixed time positions of each subframe consist of three modulation symbols per subcarrier frequency.

7. The method of claim 1, wherein defining the secondary signaling channel comprises:

determining that a particular one of the WCDs is associated with a priority level that is less than a threshold priority level; and based on the particular one of the WCDs being associated with the priority level that is less than the threshold priority level, defining the secondary signaling channel to span the at least two consecutive subframes.

8. The method of claim 7, wherein the priority level is a WCD priority level and the threshold priority level is a threshold WCD priority level.

9. The method of claim 7, wherein the priority level is a traffic priority level and the threshold priority level is a threshold traffic priority level.

10. The method of claim 1, wherein the modulation symbols of the secondary signaling channel are dynamically allocated to time positions of at least two non-contiguous subcarrier frequencies.

11. An article of manufacture including a non-transitory computer-readable medium, having stored thereon program instructions that, upon execution by a computing device, cause the computing device to perform operations comprising:

defining an orthogonal frequency-division multiplexed (OFDM) wireless air interface, wherein the OFDM wireless air interface contains time-division multiplexed subframes, and wherein a primary signaling channel is formed by modulation symbols that (i) are statically allocated to fixed time positions of each subframe, and (ii) span a plurality of contiguous subcarrier frequencies;

determining a number of consecutive subframes that a secondary signaling channel spans in the OFDM wireless air interface, wherein the number is based on respective strengths at which a specific one of one or more wireless communication devices (WCDs) receives signals on one or more of the subcarrier frequencies, and wherein the number indicates at least two consecutive subframes;

defining the secondary signaling channel in the OFDM wireless air interface, wherein the secondary signaling channel is formed by modulation symbols that (i) are dynamically allocated to time positions of one or more of the subcarrier frequencies, and (ii) span the at least two consecutive subframes of the OFDM wireless air interface; and transmitting, on the primary signaling channel, a signaling message to the one or more WCDs, wherein the signaling message is transmitted in a first subframe of the at least two consecutive subframes and identifies the secondary signaling channel, and wherein other subframes of the primary signaling channel, within the at least two consecutive subframes, are not used to identify the secondary signaling channel.

12. The article of manufacture of claim 11, wherein the signaling message indicates the number of consecutive subframes that the secondary signaling channel spans.

13. A computing device comprising:

at least one processor;

memory; and program instructions, stored in the memory, that upon execution by the at least one processor cause the computing device to perform operations comprising:

defining an orthogonal frequency-division multiplexed (OFDM) wireless air interface, wherein the OFDM wireless air interface contains time-division multiplexed subframes, and wherein a primary signaling channel is formed by modulation symbols that (i) are statically allocated to fixed time positions of each subframe, and (ii) span a plurality of contiguous subcarrier frequencies;

determining a number of consecutive subframes that a secondary signaling channel spans in the OFDM wireless air interface, wherein the number is based on respective strengths at which a specific one of one or more wireless communication devices (WCDs) receives signals on one or more of the subcarrier frequencies, and wherein the number indicates at least two consecutive subframes;

defining the secondary signaling channel in the OFDM wireless air interface, wherein the secondary signaling channel is formed by modulation symbols that (i) are dynamically allocated to time positions of one or more of the subcarrier frequencies, and (ii) span the at least two consecutive subframes of the OFDM wireless air interface; and transmitting, on the primary signaling channel, a signaling message to the one or more WCDs, wherein the signaling message is transmitted in a first subframe of the at least two consecutive subframes and identifies the secondary signaling channel, and wherein other subframes of the primary signaling channel, within the at least two consecutive subframes, are not used to identify the secondary signaling channel.

14. The computing device of claim 13, wherein the signaling message indicates the number of consecutive subframes that the secondary signaling channel spans.

15. The article of manufacture of claim 11, wherein the number of consecutive subframes that the secondary signaling channel spans is proportional to the respective strengths.

16. The article of manufacture of claim 11, wherein defining the secondary signaling channel comprises:

determining that a particular one of the WCDs is associated with a priority level that is less than a threshold priority level; and based on the particular one of the WCDs being associated with the priority level that is less than the threshold priority level, defining the secondary signaling channel to span the at least two consecutive subframes.

17. The article of manufacture of claim 16, wherein the priority level is a WCD priority level and the threshold priority level is a threshold WCD priority level.

18. The article of manufacture of claim 16, wherein the priority level is a traffic priority level and the threshold priority level is a threshold traffic priority level.

19. The computing device of claim 13, wherein the number of consecutive subframes that the secondary signaling channel spans is proportional to the respective strengths.

20. The computing device of claim 13, wherein defining the secondary signaling channel comprises:

determining that a particular one of the WCDs is associated with a priority level that is less than a threshold priority level; and based on the particular one of the WCDs being associated with the priority level that is less than the threshold priority level, defining the secondary signaling channel to span the at least two consecutive subframes.

* * * * *